US 10,480,904 B2

(12) United States Patent
Schorr et al.

(10) Patent No.: US 10,480,904 B2
(45) Date of Patent: Nov. 19, 2019

(54) GBIAS FOR RATE BASED AUTOPILOT

(71) Applicant: BAE Systems Information and Electronic Systems Integration Inc., Nashua, NH (US)

(72) Inventors: David J. Schorr, Austin, TX (US); Jeremy B. Gibson, Bedford, NH (US); James H. Steenson, New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/333,860

(22) PCT Filed: Aug. 17, 2017

(86) PCT No.: PCT/US2017/047276
§ 371 (c)(1),
(2) Date: Mar. 15, 2019

(87) PCT Pub. No.: WO2019/035834
PCT Pub. Date: Feb. 21, 2019

(65) Prior Publication Data
US 2019/0265004 A1    Aug. 29, 2019

(51) Int. Cl.
*F41G 7/22* (2006.01)
*G05D 1/10* (2006.01)
(Continued)

(52) U.S. Cl.
CPC ............. *F41G 7/2213* (2013.01); *F41G 7/36* (2013.01); *F42B 15/01* (2013.01); *F42B 15/10* (2013.01); *G05D 1/108* (2013.01); *G06F 17/11* (2013.01)

(58) Field of Classification Search
CPC ........ F41G 7/2213; F41G 7/36; F41G 7/2206; F41G 7/22; F41G 7/2253; F41G 7/00;
(Continued)

(56) References Cited

U.S. PATENT DOCUMENTS 4,123,019 A * 10/1978 Amberntson ............. F41G 7/00
            244/3.2
4,189,116 A *  2/1980 Ehrich ................. F41G 7/2253
            244/3.16
(Continued)

FOREIGN PATENT DOCUMENTS

WO    WO2018128612 A1    7/2018
WO    WO2018190788 A1    10/2018

OTHER PUBLICATIONS

International Search Report, PCT/US17/47276, 10 pages, dated Mar. 20, 2018.

*Primary Examiner* — Bernarr E Gregory
(74) *Attorney, Agent, or Firm* — Maine Cernota & Rardin; Scott J. Asmus

(57) ABSTRACT

A device, system, and method for shaping the trajectory of a projectile employing a Gravity bias, Gbias. The system includes a seeker, a guidance filter, a pitch rate filter, an actuator, pitch/yaw/roll coupled aerodynamics, and lateral rate sensors. It receives roll orientation input to a guidance and control autopilot; it applies Additional Gbias to that produced by the null rate command to the lateral control loops of the guidance and control autopilot device. The lateral rate command is equal to the desired Additional Gbias divided by an estimate of the projectile velocity. The Additional Gbias is translated to a rate command and incorporated into guidance loop commands to boost an Inherent Gbias to shape the trajectory of the projectile to the target.

20 Claims, 8 Drawing Sheets

(51) Int. Cl.
*F41G 7/36* (2006.01)
*F42B 15/01* (2006.01)
*F42B 15/10* (2006.01)
*G06F 17/11* (2006.01)

(58) Field of Classification Search
CPC .......... G05D 1/108; G05D 1/12; G05D 1/101; F42B 15/01; F42B 15/10; G06F 17/11; G01C 21/16
See application file for complete search history.

(56) References Cited

U.S. PATENT DOCUMENTS

| | | | | |
|---|---|---|---|---|
| 4,303,978 A | * | 12/1981 | Shaw | G01C 21/16 244/177 |
| 4,511,972 A | * | 4/1985 | Hofmann | G05D 1/101 244/3.21 |
| 4,590,567 A | * | 5/1986 | Hofmann | G05D 1/101 244/3.21 |
| 4,830,311 A | * | 5/1989 | Pritchard | F41G 7/22 102/384 |
| 5,062,583 A | * | 11/1991 | Lipps | F41G 7/22 244/3.15 |
| 6,254,030 B1 | * | 7/2001 | Sloan, Jr. | G05D 1/12 244/3.21 |
| 6,578,791 B1 | | 6/2003 | Jenne et al. | |
| 9,933,449 B2 | | 4/2018 | Frey, Jr. et al. | |
| 2010/0198514 A1 | * | 8/2010 | Miralles | F41G 7/2206 701/302 |
| 2014/0172200 A1 | | 6/2014 | Miralles | |

* cited by examiner

GBIAS FOR RATE BASED AUTOPILOT

RELATED APPLICATIONS

This application is related to PCT Application No. PCT/US2017/012290, filed 5 Jan. 2017, titled "DETERMINATION OF GUIDED-MUNITION ROLL ORIENTATION", and PCT Application No. PCT/US2017/026775, filed 10 Apr. 2017, titled "DYNAMIC AUTOPILOT", each of which is herein incorporated by reference in its entirety for all purposes.

FIELD OF THE DISCLOSURE

The application relates to a system, method, and device for projectile guidance and, more particularly, to shape the trajectory of a guided projectile.

BACKGROUND

There are a number of target acquisition platforms for mobile assets such as drones, aircraft, and military vehicles. In one example, the target is a military objective and a guided munition, rocket, or missile is dispatched from a mobile defense asset at the target. In embodiments, a guided projectile can be a guided munition, rocket, missile, artillery round, glide munition, or guided bomb. A rocket is a projectile/vehicle that achieves thrust from a rocket engine. A missile is a self-propelled precision-guided munition system. The guided munition may have some initial estimation of the target, but uses other mechanisms to accurately direct the guided munition to the target location. Since the delivered guided munition is destroyed on impact, there is a strong desire to provide an accurate but low cost guidance system since it is only used once. Strong motivations exist for increased targeting accuracy. This can reduce collateral damage, especially in confined areas. A component of trajectory control to achieve this accuracy is gravity bias, or Gbias. Gravity influences the guidance of projectiles by modifying the trajectory downward compared to the trajectory in the absence of gravity. Gbias compensates for the effects of gravity.

Rate based autopilots in current designs have a simplified form of Gbias that results in an inherent Gbias of 0.7 to 0.9 without any knowledge of the orientation of "Up and Down". Inherent Gbias partially corrects for acceleration due to gravity. Since the inherent Gbias of current methods is below 1.0, the resulting trajectories at longer range are very flat, and in some cases are actually pulling up in the endgame, skimming just a few feet above the ground for many tens of meters in front of the target. The end result is a very low and flat flight trajectory during terminal guidance and high lift requirements on the airframe in the end game. In some cases the low flat trajectory shape results in ground impacts in front of the target, warhead skips and fuze malfunctions, reduced warhead effectiveness due to the proximity of a near ground impact miss, and a reduced maximum range. These previous attempts to shape the trajectory were primarily accomplished by operating with a relatively low proportional navigation gain. The low navigation gain allowed the rocket to stay higher earlier in the engagement and to pull down on the target later in the flight when inertial line-of-sight (ILOS) rate errors increased. The method was somewhat effective given the data available to the autopilot.

What is needed is a technique to reshape guidance and control trajectory to substantially extend maximum range capability as well as improve the terminal flight path angles without any negative effects when engaging short and medium range targets, increasing the probability of hit, reducing Circular Error Probability (CEP), and increasing the terminal flight path angle for increased warhead precision.

SUMMARY

Desired Gbias is composed of two terms, Inherent Gbias and Additional Gbias. Inherent Gbias is the inherent vertical acceleration level that is produced by the null rate command of the lateral control loops. Additional Gbias is the bias added for trajectory shaping. An embodiment provides a method for shaping a trajectory of a projectile comprising obtaining input to a guidance and control autopilot system (870) of the projectile, wherein the input comprises roll orientation (705) with respect to gravity, and an estimate of a velocity (710) of the projectile, and providing the input to at least one processor of the guidance and control autopilot system (870); applying an Additional gravity bias (Gbias) (730) to an Inherent Gbias (715); determining a total rate command (735) by at least one processor of the guidance and control autopilot system (870), wherein the Additional rate command is determined by dividing an Additional Gbias (725) by the estimate of the velocity (710) of the projectile; and whereby the guidance and control autopilot system (870) is configured to guide the projectile to a target (740) using the total rate command of the guidance and control autopilot system (870). Embodiments comprise determining the Inherent Gbias amount (715) produced by null guidance and control lateral rate control loops of the guidance and control autopilot system (870). Other embodiments comprise determining a Desired Gbias amount (720); and determining the Additional Gbias amount (725). In subsequent embodiments $$\dot{\gamma}_c = \frac{a_m}{V_m} = \frac{Gbias}{V_m}$$

wherein $\dot{\gamma}_c$ comprises the additional rate command (735) for use by lateral control loops, $a_m$ comprises an estimate of the additional lateral acceleration of the projectile, $V_m$ comprises the estimate of the velocity of the projectile (710), and Gbias comprises the Additional Gbias (725). For additional embodiments, an orientation of a roll inertial guidance coordinate frame with respect to gravity is utilized to partition the Additional Gbias into pitch and yaw control loops. In another embodiment, the guidance and control autopilot system does not comprise an accelerometer, whereby complexity and cost of the projectile is reduced. For a following embodiment the Additional Gbias magnitude balances guidance errors with trajectory lofting to produce a near 0 G airframe in an end game. In subsequent embodiments the Additional Gbias lofts the trajectory after a seeker laser acquisition. In additional embodiments terminal lateral G requirements of an airframe are ballistic, near 0 G, and residual airframe lateral Gs are available to absorb other endgame guidance errors; the other endgame guidance errors comprising rate sensor errors and seeker errors that have a random orientation with respect to gravity.

Another embodiment provides a system for shaping a trajectory of a projectile comprising a guidance and control autopilot (870); at least one processor of the guidance and control autopilot (870) executing a program performing as follows: processing a roll orientation (705) with respect to gravity and an estimate of a velocity (710) of the projectile; determining an Inherent Gbias amount (715) produced by null guidance and control lateral rate control loops of the guidance and control autopilot (870); determining a Desired Gbias amount (720); determining an Additional Gbias amount (725); applying the Additional Gbias (730) to the Inherent Gbias (715); determining a total rate command (735) by the at least one processor of the guidance and control autopilot system (870), wherein the total rate command is determined by dividing the Additional Gbias by the estimate of the velocity (710) of the projectile; and guiding the projectile to a target (740) using the total rate command from the guidance and control autopilot. In included embodiments the guidance and control autopilot (870) comprises lateral acceleration sensors (875); lateral turn rate sensors (880); velocity sensors (885); and an orientation determination system (890), wherein the orientation determination system (890) receives input from the lateral acceleration sensors (875), the lateral turn rate sensors (880), and the velocity sensors (885). In yet further embodiments the roll orientation (705) is input after launch. In related embodiments $$\dot{\gamma}_c = \frac{a_m}{V_m} = \frac{Gbias}{V_m}$$

wherein $\dot{\gamma}_c$ comprises the additional rate command (735) for use by the lateral control loops, $a_m$ comprises an estimate of an additional lateral acceleration of the projectile, $V_m$ comprises the estimate of the velocity of the projectile (710), and Gbias comprises the Additional Gbias (725). For further embodiments, determination of the roll orientation (705) with respect to gravity comprises a magnetometer. In ensuing embodiments, determination of the roll orientation (705) with respect to gravity comprises an initialized inertial measurement unit (IMU). For yet further embodiments, sensors of the guidance and control autopilot (870) comprise only rate sensors. For more embodiments, the guidance and control autopilot (870) comprises a seeker. In continued embodiments, the guidance and control autopilot is an angular rate based autopilot. For additional embodiments, the system does not comprise an accelerometer, whereby complexity and cost of the projectile is reduced.

A yet further embodiment provides a guidance and control autopilot device for shaping a trajectory of a projectile comprising a feed forward section; a guidance filter (216); pitch/yaw/roll coupled aerodynamics (234); a feed forward section; a pitch rate sensor; wherein a processor determines a total rate command (735) equal to an Additional Gbias (725) divided by an estimate of a velocity (710) of the projectile, incorporating a roll orientation (705) with respect to gravity; and whereby the guidance and control autopilot device is configured to guide the projectile to a target.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments augment the rate loop architecture with a small Gbias in the vertical direction. Embodiments include input of roll orientation with respect to gravity. In embodiments, the ability to determine the roll orientation with respect to gravity provides for a much more direct and effective way of reshaping the vertical trajectory to increase range, probability of hit, and warhead results.

Advantages include a large increase in maximum effective range with no negative impact on short and mid-range targets. Flight path angles and rocket pitch angles are substantially improved, providing for a much higher probability of hit, improved fuze function on horizontal targets, and much closer ground impacts for near misses, resulting in much higher warhead accuracy and effectiveness for longer range targets.

Embodiments provide for trajectory shaping and performance improvement for any rate-based autopilot design.

Figure 1:
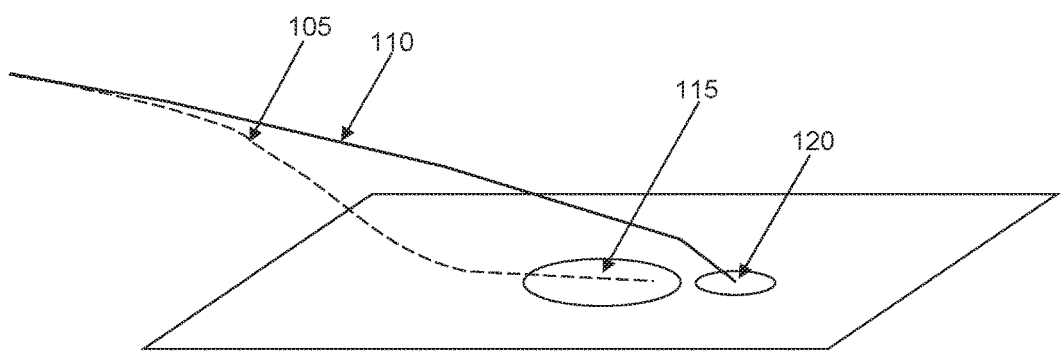
FIG. 1 depicts a trajectory configured in accordance with an embodiment.

FIG. 1 depicts trajectories 100. Standard trajectory 105 is compared with improved trajectory 110. Standard trajectories 105 at longer range are very flat, and many times are actually pulling up in the endgame, skimming just a few feet above the ground for many tens of meters in front of the target. The end result is a very low and flat flight trajectory during terminal guidance and high lift demands on the airframe in the end game. Many times the low flat trajectory shape results in ground impacts in front of the target, warhead skips and fuze malfunctions, reduced warhead effectiveness due to the proximity of a near ground impact miss 115, and a significantly reduced maximum range compared to shaped trajectories 120.

In embodiments, Gbias is added to shape the guided rocket trajectory. The total rate bias that is introduced is determined based on the additional vertical Gs that are preferred above inherent levels that are produced by the null rate command of the guidance and control lateral control loops. It is possible for Gbias values below 1.0 to result in sagging trajectories, poor flight path angles, ground impacts in front of the target and reduced accuracy. For embodiments, the objective is to add Additional Gbias to boost the Inherent low Gbias to 1.0 or more. The Additional Gbias is translated to a rate command for use by the lateral control loops as follows, where $\dot{\gamma}_c$ is the additional rate command (735) for use by the lateral control loops, $a_m$ is an estimate of additional acceleration of the projectile, $V_m$ is the estimate of the velocity of the projectile (710), and Gbias is the Additional Gbias (725).

$$\dot{\gamma}_c = \frac{a_m}{V_m} = \frac{Gbias}{V_m} \quad \text{(EQ. 1)}$$

The total rate command introduced to the airframe is equal to the Additional Gbias divided by an estimate of the missile velocity $V_m$ combined with the guidance loop commands. Typical turn rate command produced by the Additional Gbias is under 1 degree per second (i.e. (0.4Gs*9.81)/(300 m/s)=>0.75 degrees/second), but has a dramatic effect on the trajectory shape. The roll orientation (with respect to the direction of gravity) of the rocket is known. The orientation of the rocket with respect to gravity is utilized to partition the bias into the pitch and yaw control loops. In embodiments, the Gbias components of the airframe turn rate commands are added with guidance commands to produce a total turn rate command for the airframe.

Figure 2:
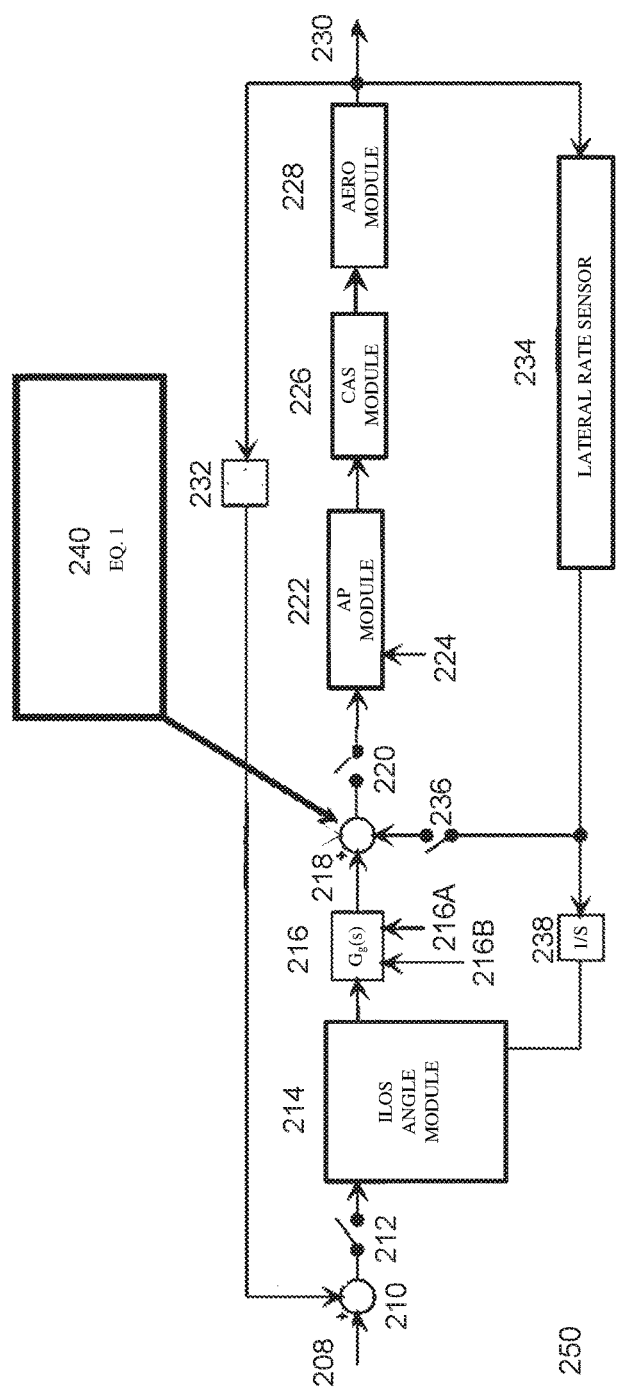
FIG. 2 is a diagram of system components configured in accordance with an embodiment.

FIG. 2 illustrates functional module components of a guidance and control autopilot system 200 for an embodiment. The system comprises input $\lambda_p$ 208 to adder 210 leading to switch 212. Switch 212 provides input to Inertial Line of Sight (ILOS) Angle Module 214 which provides input λ to Guidance Filter $G_g(S)$ 216 which provides input to adder 218. Guidance Filter 216 also has inputs Mn(t) 216A and $W_{SNR}$ 216B. Adder 218 provides input to switch 220 which provides input to AP Module 222 which has input Mn(t) 224. AP Module 222 provides input to Control Actuation System (CAS) Module 226 which provides input to Aero Module feed forward section 228. Aero Module 228 provides lateral rate output q 230 which provides input to lateral rate sensor 234, which provides measured lateral rate 236 to the autopilot. The rate sensor output is also input to integrator 1/S 238, and is utilized by the ILOS Angle Module 214. 1/S 238 provides input θ back to adder 210. Rate Sensor Feedback Section 234 provides input to switch 236 and 1/S 238. Switch 236 provides input to adder 218. 1/S 238 provides $\theta_{Scn}$ input to ILOS Angle Module 214. Adder 218 implements the results from EQ. 1 240.

$$\dot{\gamma}_c = \frac{a_m}{V_m} = \frac{Gbias}{V_m}$$

where $\dot{\gamma}_c$=the additional rate command for use by the lateral control loops, $a_m$=the additional lateral acceleration of the missile, $V_m$=an estimate of the velocity of the missile (710), and Gbias=the Additional Gbias (725).

Figure 3:
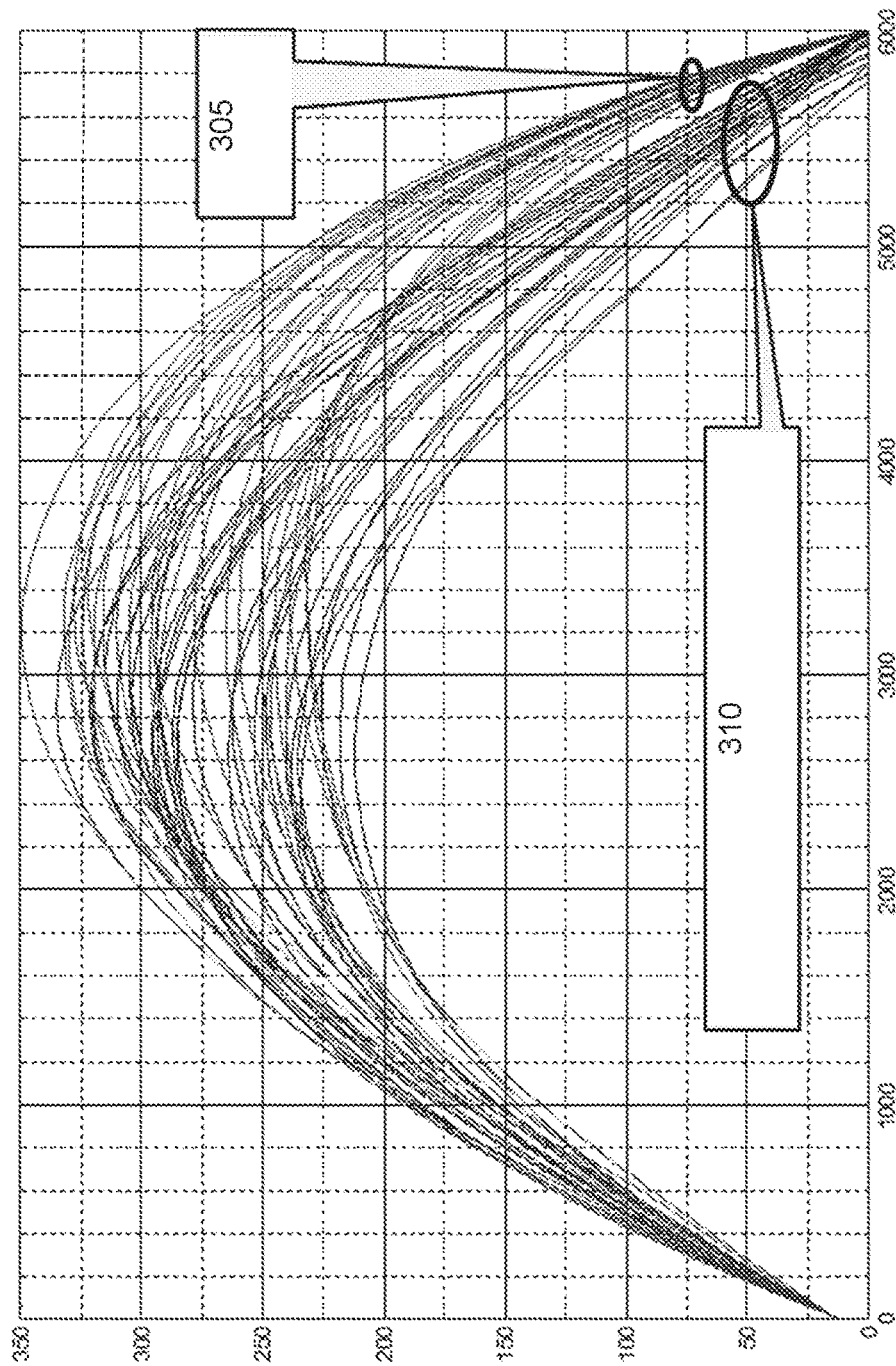
FIG. 3 illustrates trajectory shapes showing Probability of hit (Phit) with and without Gbias configured in accordance with an embodiment.

FIG. 3 depicts trajectory shapes showing terminal accuracy with and without Gbias 300. An optimal Gbias magnitude balances guidance errors with trajectory lofting to produce near 0 G airframe in the end game, substantially increasing maximum range and improving the terminal flight path angle. The effect of Gbias can be seen in the trajectory shapes. Trajectory is depicted as altitude 0 to 350 meters above ground over 0 to 6,000 meters down range. 'With Gbias' is shown by curves 305, having a high terminal accuracy. Trajectory altitude above ground in meters without Gbias is shown by curves 310, having a poor terminal accuracy. In embodiments, accuracy was improved from about 15 to about 90 percent.

Figure 4:
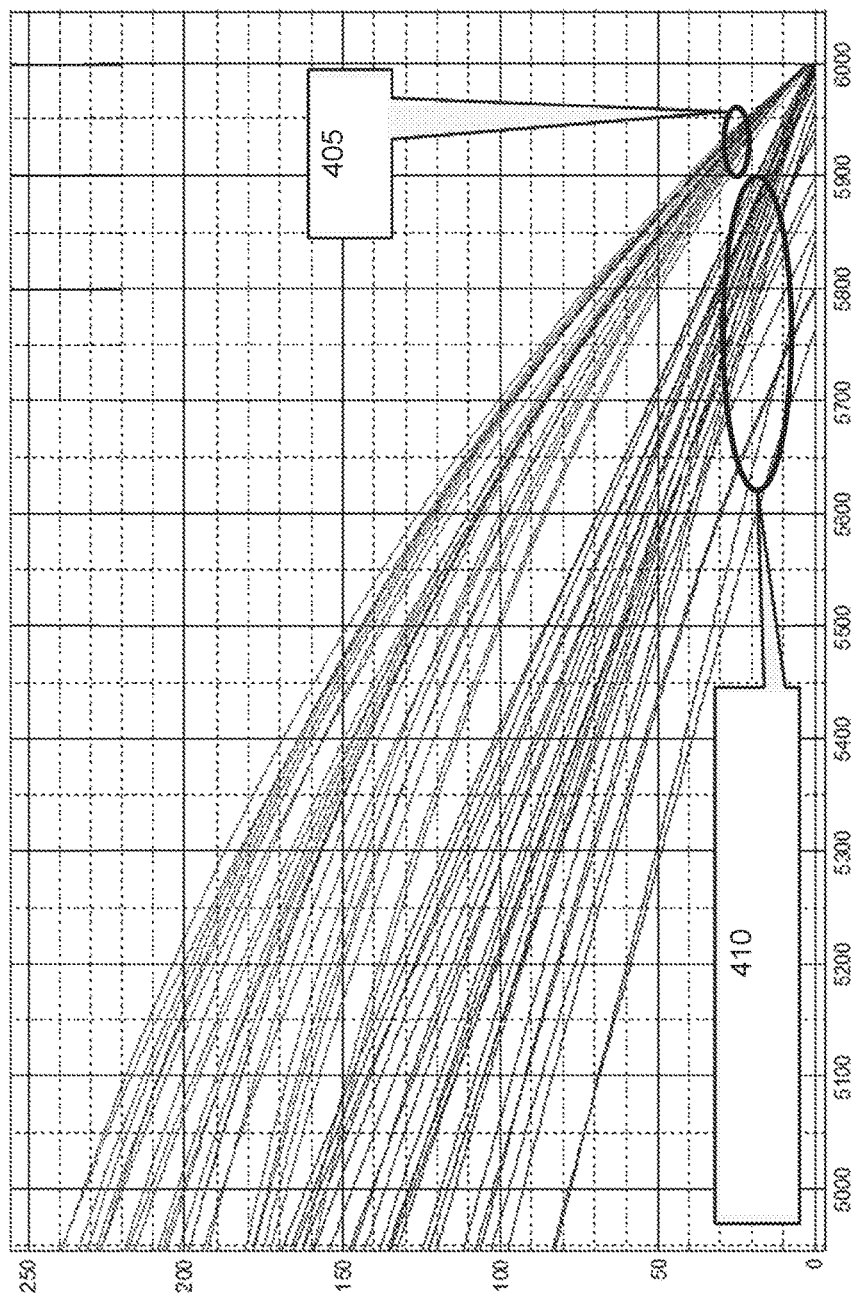
FIG. 4 illustrates terminal trajectories with and without Gbias configured in accordance with an embodiment.

FIG. 4 illustrates the terminal flight path 400, depicting details of FIG. 3. Curves show simulation results with Gbias 405 and without Gbias 410. These curves more clearly depict details of FIG. 3 from 5,000 to 6,000 meters (the target site) from 0 to 250 meters altitude.

Figure 5:
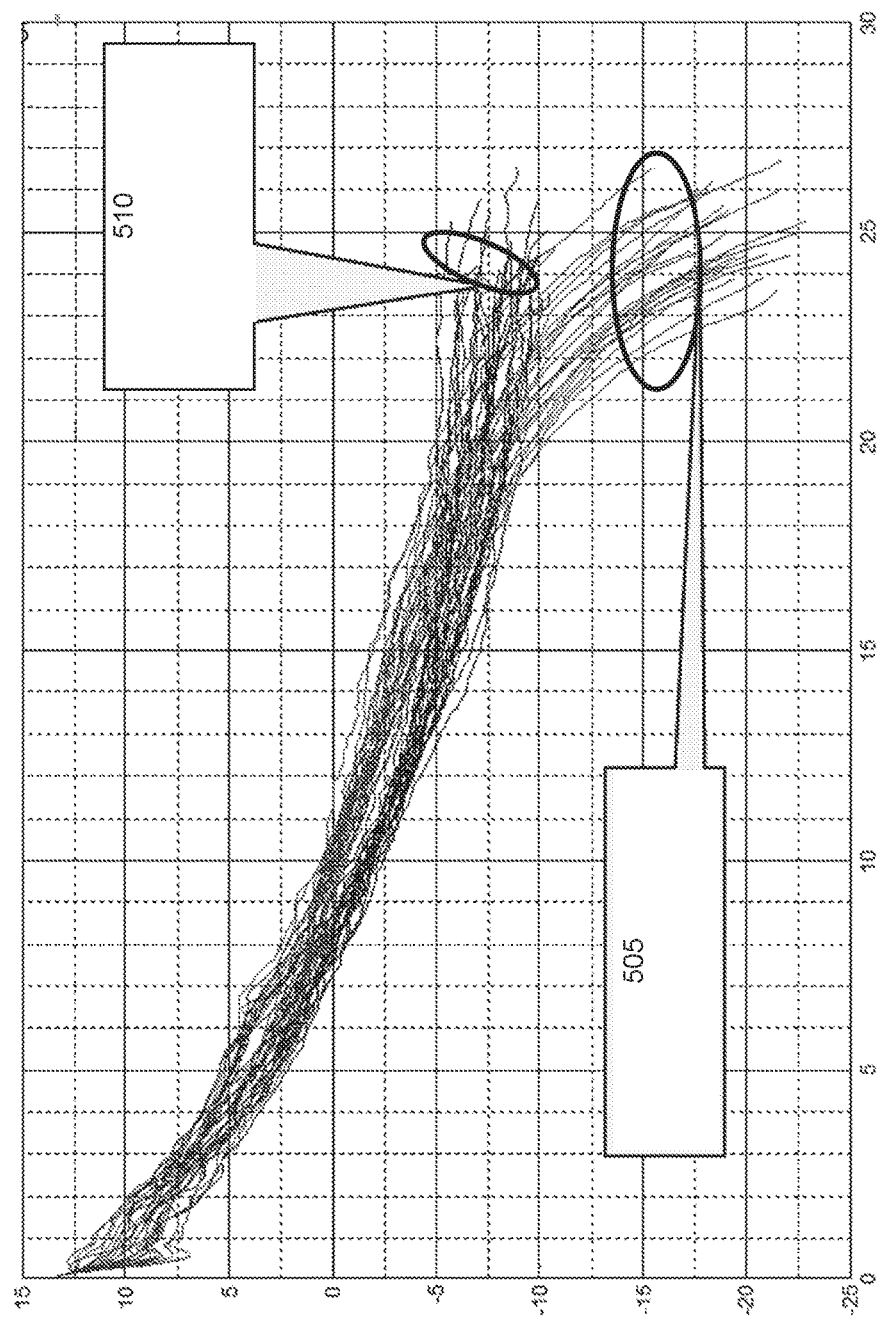
FIG. 5 illustrates terminal flight path angles with and without Gbias configured in accordance with an embodiment.

FIG. 5 depicts terminal vertical flight path angles between −25 to +15 degrees over a 0 to 30 second time from first motion 500. FIG. 5 shows that the terminal flight path angle is also much steeper with Gbias as seen in the trajectory shapes shown in FIGS. 3 and 4. Curves show angles with Gbias 505 at approximately −18 degrees, and without Gbias 510 at approximately −7.5 degrees. Steeper flight path angles (with Gbias) are extremely helpful with targeting effectiveness for at least two reasons. First, the terminal accuracy is much higher due to lower airframe maneuverability needs, and second, because the ground footprint of a near miss is substantially reduced by more than doubling the terminal flight path angle.

Figure 6:
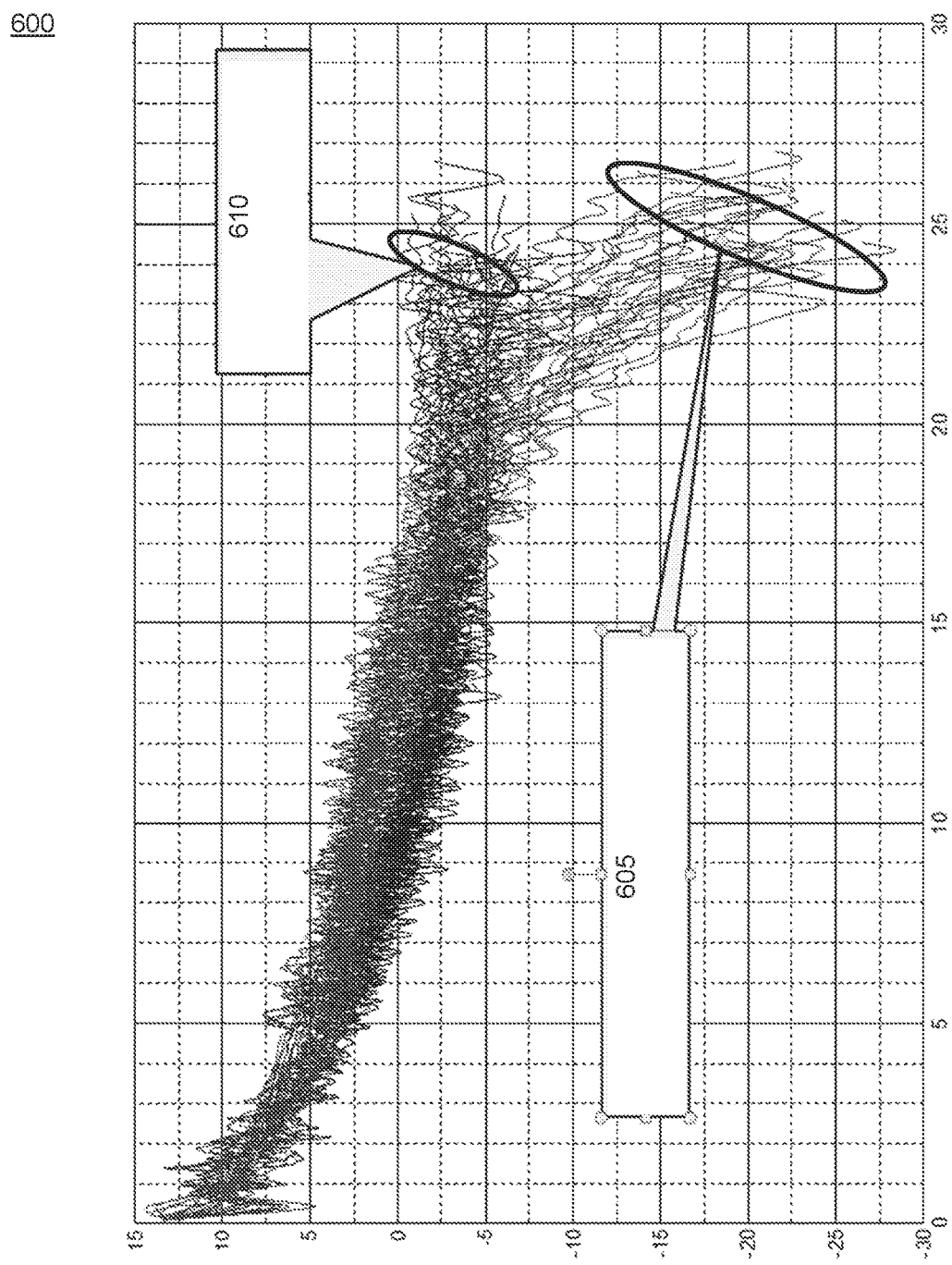
FIG. 6 illustrates terminal pitch angles with and without Gbias configured in accordance with an embodiment.

FIG. 6 shows the terminal pitch angles between −30 to +15 degrees over a 0 to 30 second time from first motion 600. Curves depict angles with Gbias 605 at approximately −20.3 degrees, and without Gbias 610 at approximately −4.4 degrees. FIG. 6 shows that the terminal pitch angle of the rocket is also much steeper as seen in the trajectory shape above, and the rocket pitch angles here. Steeper pitch angles are important to insure that the fuze in the nose of the rocket hits first and functions correctly when shooting at horizontal targets or when there is a ground impact very close to the target.

The substantial increase in accuracy at longer ranges is primarily caused by a large reduction in the maneuver requirements on the airframe due to the trajectory shaping. A Gbias has been selected that lofts the trajectory after seeker laser acquisition so that proportional navigation guidance commands can pull the airframe down into the target at a rate that is similar to a ballistic trajectory. The terminal guidance vertical Gs required before the addition of Gbias were approximately 1 G or more, while with Gbias, the terminal lateral G requirements of the airframe are near 0 Gs (ballistic). As a result, the residual airframe lateral G capability is then available to absorb other endgame guidance errors such as rate sensor errors and seeker errors that have a random orientation with respect to gravity.

Figure 7:
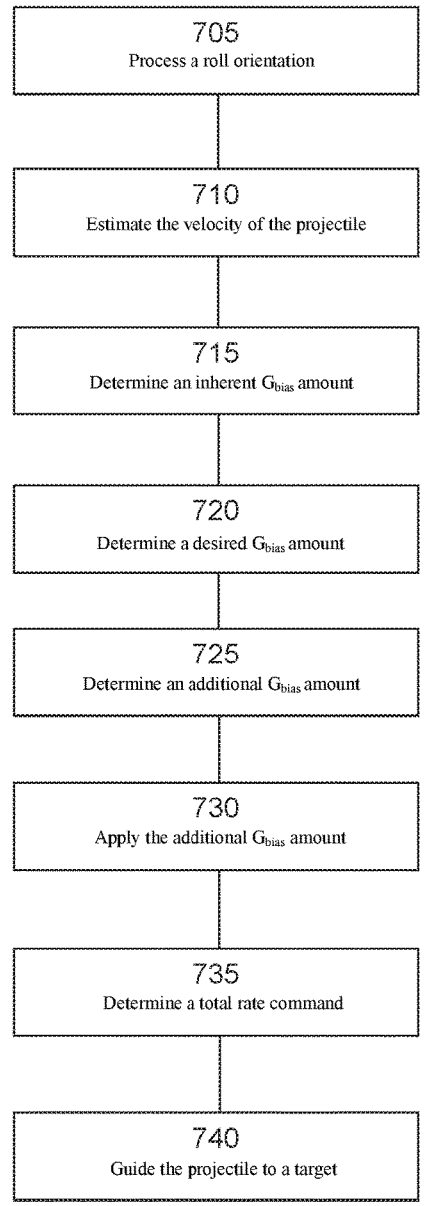
FIG. 7 is a flow chart for a method for shaping a projectile trajectory configured in accordance with an embodiment.

FIG. 7 is a flow chart 700 depicting the steps of a method for shaping a trajectory of a projectile in a guidance and control autopilot. Steps comprise determining roll orientation with respect to gravity 705; determining an estimate of the velocity of the projectile 710; determining an Inherent Gbias value 715 produced by null guidance and control lateral rate control loops of the guidance and control autopilot; determining a Desired Gbias value 720; determining an Additional Gbias value 725; applying 730 the Additional Gbias value 725 to the Inherent Gbias value 715; determining a total rate command where the total rate command is determined by dividing the Desired Gbias by the estimate of the projectile velocity 735; and guiding the projectile to a target 740. In embodiments, the Additional Gbias amount is optimized/determined through studies and selected to achieve the desired trajectory effect, for example: lofting of a trajectory or turning towards the ground more aggressively than achieved by gravity alone, as in a high altitude UAV application. The Inherent Gbias of an airframe in this context is the average vertical Gs that are developed by an airframe with a lateral rate controller and a null rate command input. The resulting Inherent Gbias is usually less than 1.0 G due to the finite stiffness of the lateral rate control loops and the increase in angle of attack as the airframe slows down. The Inherent Gbias may be determined (715) with modeling and simulation techniques and is a function of lateral control loop stiffness, flight path angle (and associated velocity and time history of angle of attack). The Desired Gbias (720) is determined by modeling and simulation and is selected to result in a near 0.0 airframe G loading during the final seconds before target impact. One method for determining the Desired Gbias is implementation of the Augmented Proportional Navigation method. The method for determining the Additional Gbias (725) is to subtract the Inherent Gbias from the Desired Gbias (Additional Gbias=Desired Gbias−Inherent Gbias). The Additional Gbias is translated (730) to lateral rate commands by dividing the desired Additional Gbias in each lateral axis by a velocity estimate. The result for each lateral rate control loop is an angular rate command that can be added directly to the guidance command input for each lateral rate control loop.

Figure 8:
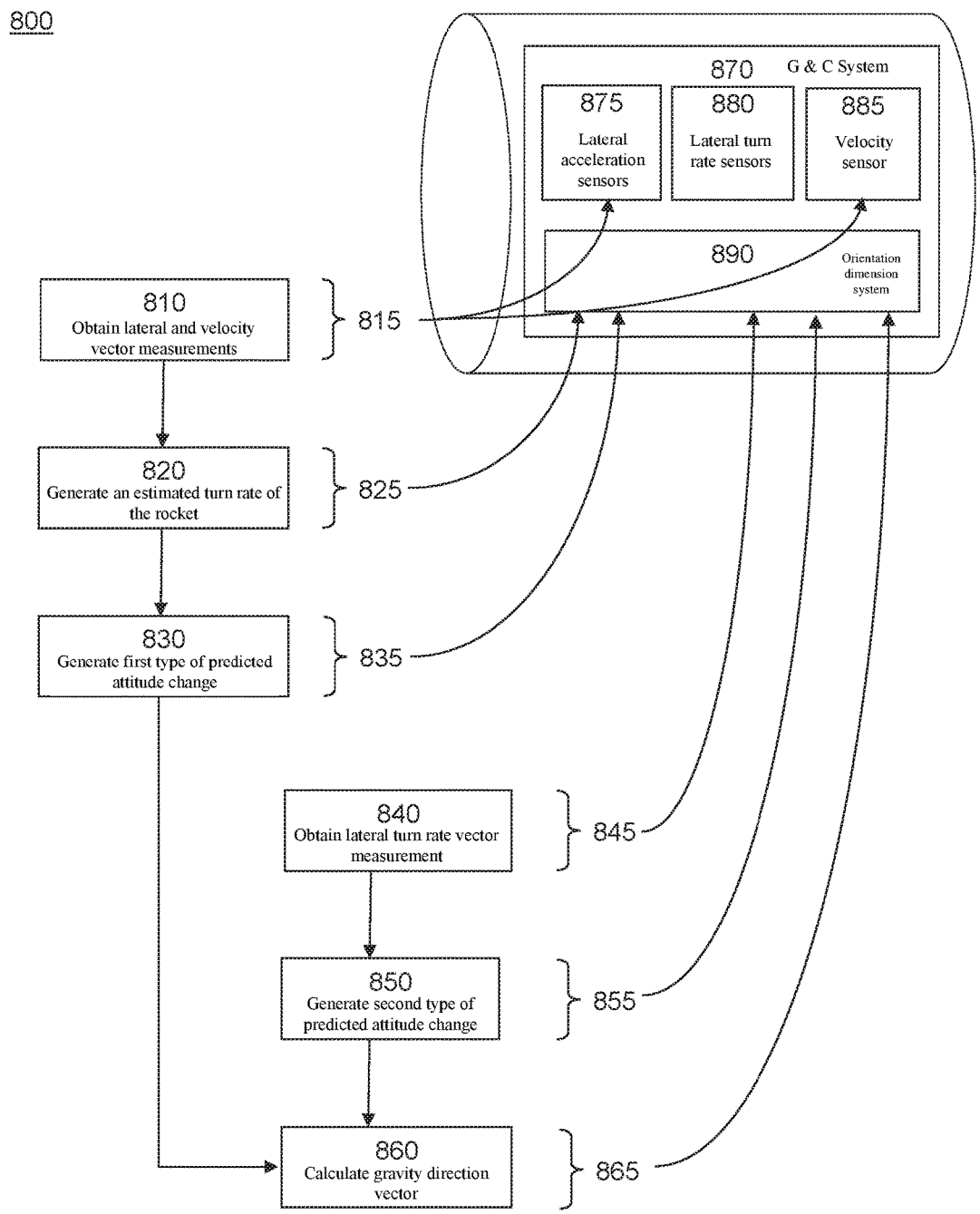
FIG. 8 is a flowchart illustrating a methodology for determination of a rocket orientation configured in accordance with an embodiment.

FIG. 8 is a flowchart illustrating an example method 800 for determination of a rocket orientation, in accordance with an embodiment of the present disclosure. As can be seen, example method 800 includes a number of phases and sub-processes, the sequence of which may vary from one embodiment to another. However, when considered in the aggregate, these phases and sub-processes form a process for automated rocket orientation determination in accordance with certain of the embodiments disclosed herein. Embodiments may include, for example, varying degrees of integration wherein multiple functionalities are effectively performed by one system. For example, in an alternative embodiment a single module can be used to perform all of the functions of method 800. Thus, other embodiments may have fewer or more modules and/or sub-modules depending on the granularity of implementation. Numerous variations and alternative configurations will be apparent in light of this disclosure. As illustrated in FIG. 8, in one embodiment, method 800 for rocket roll orientation determination commences, at operation 810, by obtaining a lateral acceleration vector measurement and a velocity vector measurement of the rocket (or a reading from a stored velocity profile), for example at multiple times between launch and impact of the rocket. In some embodiments, the lateral acceleration vector measurement is calculated as a vector sum of data provided by a first lateral acceleration sensor and data provided by a second lateral acceleration sensor, wherein the second sensor measures lateral accelerations in a direction that is orthogonal to those measured by the first sensor. (For some embodiments, note that orthogonality is not specifically required so long as the lateral acceleration vector magnitude and direction can be established.) Otherwise, therefore, in embodiments, this is calculated from lateral acceleration sensors 875 and a velocity sensor 885 (or velocity profile) 815. At operation 820, a ratio of the lateral acceleration vector measurement to the velocity vector measurement is calculated to generate an estimated turn rate of the rocket. In embodiments, this is calculated in vector division circuit 825 in orientation determination system 890. Therefore, in embodiments, lateral acceleration sensors 875 has/have no accelerometers. Next, at operation 830, the estimated turn rate is integrated over a period of time associated with flight of the rocket, to generate a first type of predicted attitude change. In embodiments, this is calculated in temporal integration circuit 835 in orientation determination system 890. At operation 840, a lateral turn rate vector measurement of the rocket is obtained, for example at multiple times between launch and impact of the rocket. In some embodiments, the lateral turn rate vector measurement is calculated as a vector sum of data provided by a first lateral turn rate sensor and data provided by a second lateral turn rate sensor 845 (both 880), also in orientation determination system 890. The second sensor measures turn rates in a direction that is orthogonal to those measured by the first sensor. At operation 850, the lateral turn rate vector measurement is integrated over the period of time associated with flight of the rocket, to generate a second type of predicted attitude change. In embodiments, this is calculated in second temporal integration circuit 855 in orientation determination system 890. At operation 860, a gravity direction vector is calculated based on a difference between the first type of predicted attitude change and the second type of predicted attitude change. In embodiments, this is calculated in vector subtraction circuit 865 in orientation determination system 890. In some embodiments, a ground-pointing orientation angle may then be calculated based on the gravity direction vector. Once the rocket orientation is known, that orientation can be provided to the guidance and control system as described previously in flowchart FIG. 7, step 705, and used for trajectory shaping and execution of rocket maneuvers, such as turning the rocket towards ground and/or controlling a terminal flight path angle of the guided munition to an intended target. Additionally, such maneuvers may allow for shaping of the rocket's vertical trajectory to extend the maximum range of the rocket. In embodiments, the method is carried out in a guidance and control (G&C) system 870 comprising lateral acceleration sensors 875, lateral turn rate sensors 880, and velocity sensor 885, each providing input to orientation determination system 890.

The computing system used for shaping the trajectory of a projectile employing a Gravity bias for performing (or controlling) the operations or functions described hereinabove with respect to the system and/or the method may include a processor, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present disclosure describes a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for shaping a trajectory of a projectile comprising:
    obtaining input to a guidance and control autopilot system of the projectile, wherein the input comprises roll orientation with respect to gravity, and an estimate of a velocity of the projectile, and providing the input to at least one processor of the guidance and control autopilot system;
    applying an Additional gravity bias (Gbias) to an Inherent Gbias;
    determining a total rate command by the at least one processor of the guidance and control autopilot system, wherein an additional rate command is determined by dividing the Additional Gbias by the estimate of the velocity of the projectile; and
    whereby the guidance and control autopilot system is configured to guide the projectile to a target using the total rate command of the guidance and control autopilot system.

2. The method of claim 1, comprising:
    determining the Inherent Gbias amount produced by null guidance and control lateral rate control loops of the guidance and control autopilot system.

3. The method of claim 1, comprising:
    determining a Desired Gbias amount; and
    determining the Additional Gbias amount.

4. The method of claim 3, wherein an orientation of a roll inertial guidance coordinate frame with respect to gravity is utilized to partition the Desired Gbias into pitch and yaw control loops.

5. The method of claim 3, wherein the Desired Gbias magnitude balances guidance errors with trajectory lofting to produce a near 0 G airframe in an end game.

6. The method of claim 3, wherein the Desired Gbias lofts the trajectory after a seeker laser acquisition.

7. The method of claim 1, where $$\dot{\gamma}_c = \frac{a_m}{V_m} = \frac{Gbias}{V_m}$$

wherein $\dot{\gamma}_c$ comprises the additional rate command for use by lateral control loops, $a_m$ comprises an estimate of an additional lateral acceleration of the projectile, $V_m$ comprises the estimate of the velocity of the projectile, and Gbias comprises the Additional Gbias.

8. The method of claim 1, wherein the guidance and control autopilot system does not comprise an accelerometer, whereby complexity and cost of the projectile is reduced.

9. The method of claim 1, wherein terminal lateral G requirements of an airframe are ballistic, near 0 G, and residual airframe lateral Gs are available to absorb other endgame guidance errors;
    the other endgame guidance errors comprising rate sensor errors and seeker errors that have a random orientation with respect to gravity.

10. A system for shaping a trajectory of a projectile comprising:
    a guidance and control autopilot;
    at least one processor of the guidance and control autopilot executing a program performing as follows:
    processing a roll orientation with respect to gravity and an estimate of a velocity of the projectile;
    determining an Inherent Gbias amount produced by null guidance and control lateral rate control loops of the guidance and control autopilot;
    determining a Desired Gbias amount;
    determining an Additional Gbias amount;
    applying the Additional Gbias to the Inherent Gbias;
    determining a total rate command by the at least one processor of the guidance and control autopilot system, wherein the total rate command is determined by dividing the Desired Gbias by the estimate of the velocity of the projectile; and
    guiding the projectile to a target using the total rate command from the guidance and control autopilot.

11. The system of claim 10 wherein the guidance and control autopilot comprises:
    lateral acceleration sensors;
    lateral turn rate sensors;
    velocity sensors; and
    an orientation determination system, wherein the orientation determination system receives input from the lateral acceleration sensors, the lateral turn rate sensors, and the velocity sensors.

12. The system of claim 10, wherein the roll orientation is input after launch.

13. The system of claim 10, where $$\dot{\gamma}_c = \frac{a_m}{V_m} = \frac{Gbias}{V_m}$$

wherein $\dot{\gamma}_c$ comprises the additional rate command for use by the lateral control loops, $a_m$ comprises an estimate of an additional lateral acceleration of the projectile, $V_m$ comprises the estimate of the velocity of the projectile, and Gbias comprises the Additional Gbias.

14. The system of claim 10, wherein determination of the roll orientation with respect to gravity comprises a magnetometer.

15. The system of claim 10, wherein determination of the roll orientation with respect to gravity comprises an initialized inertial measurement unit (IMU).

16. The system of claim 10, wherein sensors of the guidance and control autopilot comprise only rate sensors.

17. The system of claim 10, wherein the guidance and control autopilot comprises a seeker.

18. The system of claim 10, wherein the guidance and control autopilot is an angular rate based autopilot.

19. The system of claim 10, wherein the system does not comprise an accelerometer, whereby complexity and cost of the projectile is reduced.

20. A guidance and control autopilot device for shaping a trajectory of a projectile comprising:
 a feed forward section;
 a guidance filter;
 pitch/yaw/roll coupled aerodynamics;
 a feed forward section;
 a pitch rate sensor;
 wherein at least one processor determines a total rate command equal to an Additional Gbias divided by an estimate of a velocity of the projectile, combined with guidance loop commands, incorporating a roll orientation with respect to gravity; and
 whereby the guidance and control autopilot device is configured to guide the projectile to a target.

* * * * *